(12) United States Patent
Mu (10) Patent No.: US 12,096,462 B2
(45) Date of Patent: Sep. 17, 2024

(54) METHOD AND APPARATUS FOR DETERMINING PROCESSING CAPACITY APPLICABLE FOR TARGET DATA

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 310 days.

(21) Appl. No.: 17/627,034

(22) PCT Filed: Jul. 16, 2019

(86) PCT No.: PCT/CN2019/096236
§ 371 (c)(1),
(2) Date: Jan. 13, 2022

(87) PCT Pub. No.: WO2021/007788
PCT Pub. Date: Jan. 21, 2021

(65) Prior Publication Data
US 2022/0256528 A1    Aug. 11, 2022

(51) Int. Cl.
*H04W 8/22* (2009.01)
*H04W 8/24* (2009.01)
(Continued)

(52) U.S. Cl.
CPC .............. *H04W 72/51* (2023.01); *H04W 8/22* (2013.01); *H04W 8/245* (2013.01); *H04W 72/0446* (2013.01); *H04W 72/0453* (2013.01); *H04W 72/11* (2023.01); *H04W 72/1263* (2013.01); *H04W 72/23* (2023.01);
(Continued)

(58) Field of Classification Search
CPC ..... H04W 8/22–26; H04W 72/02–569; H04W 84/02–16; H04W 88/02–12; H04W 92/02–04; H04W 92/10
See application file for complete search history.

(56) References Cited

U.S. PATENT DOCUMENTS

| 8,750,903 B1 | 6/2014 | Fitzsimmons et al. |
| 2019/0149365 A1 | 5/2019 | Chatterjee et al. |

(Continued)

FOREIGN PATENT DOCUMENTS

WO    WO 2019113774 A1    6/2019

OTHER PUBLICATIONS

Indian Patent Application No. 202247007749, Office Action dated Jul. 19, 2022, 7 pages.
(Continued)

*Primary Examiner* — Timothy J Weidner
(74) *Attorney, Agent, or Firm* — Cozen O'Connor (57) ABSTRACT

A method and an apparatus for determining appropriate processing capability for target data. The method includes: detecting capability indication information configured for characterizing a processing capability applicable for target data; determining the processing capability applicable for the target data based on the capability indication information. The method also includes: determining capability indication information configured for characterizing a processing capability applicable for target data; transmitting the capability indication information.

7 Claims, 7 Drawing Sheets

(51) Int. Cl.
    *H04W 72/0446* (2023.01)
    *H04W 72/0453* (2023.01)
    *H04W 72/11* (2023.01)
    *H04W 72/1263* (2023.01)
    *H04W 72/23* (2023.01)
    *H04W 72/231* (2023.01)
    *H04W 72/232* (2023.01)
    *H04W 72/51* (2023.01)
    *H04W 84/02* (2009.01)
    *H04W 88/02* (2009.01)
    *H04W 88/08* (2009.01)
    *H04W 92/02* (2009.01)
    *H04W 92/10* (2009.01)

(52) U.S. Cl.
    CPC ....... *H04W 72/231* (2023.01); *H04W 72/232* (2023.01); *H04W 84/02* (2013.01); *H04W 88/02* (2013.01); *H04W 88/08* (2013.01); *H04W 92/02* (2013.01); *H04W 92/10* (2013.01)

(56) References Cited

U.S. PATENT DOCUMENTS

| | | | |
|---|---|---|---|
| 2021/0144547 A1* | 5/2021 | Feng | H04W 72/51 |
| 2022/0053320 A1* | 2/2022 | Takeda | H04W 72/51 |
| 2022/0286973 A1* | 9/2022 | Takahashi | H04W 72/12 |

OTHER PUBLICATIONS

European Patent Application No. 19937448.9, Search and Opinion dated Feb. 6, 2023, 12 pages.
NTT Docomo, Inc. "Enhancements to scheduling HARQ for URLLC" 3GPP TSG RAN WG1 #97, R1-1906214, May 2019, 11 pages.
Huawei, et al. "Clarification on pdsch-ProcessingType2" 3GPP TSG RAN WG2 #106, R2-1908514, May 2019, 6 pages.
Chinese Patent Application No. 201980001359.1, Office Action dated Feb. 27, 2023, 4 pages.
Chinese Patent Application No. 201980001359.1, English translation of Office Action dated Feb. 27, 2023, 8 pages.
PCT/CN2019/096236 English translation of International Search Report dated Apr. 15, 2020, 2 pages.

* cited by examiner

METHOD AND APPARATUS FOR DETERMINING PROCESSING CAPACITY APPLICABLE FOR TARGET DATA

CROSS REFERENCE TO RELATED APPLICATIONS

This application is a U.S. national phase application based on International Application No. PCT/CN2019/096236, filed Jul. 16, 2019, the content of which is incorporated herein by reference for all purposes.

TECHNICAL FIELD

The disclosure relates to a field of communication technologies, and more particularly to a method and an apparatus for determining processing a capability applicable for target data.

BACKGROUND

Terminals supporting multiple types of services and different capability levels have been made and used in the field.

The terminals with different capabilities having different processing capabilities for data. Terminals supporting a relatively high processing capability are capable of processing data at a relatively high speed. Terminals supporting a relatively low processing capability are capable of processing data at a relatively low speed.

In related arts, different processing capabilities of the terminals when processing data are specified, which are respectively Capability 1 and Capability 2, hereinafter referred to as Cap 1 and Cap 2. The terminals require different times to process data under different processing capabilities. For a terminal, an enabled processing capability is configured towards a certain carrier wave of a cell. When an enabled Cap 2 capability is configured on the carrier wave of the cell, all data received and transmitted by the terminal on the carrier are processed according to a time required for the Cap 2. When there is not the enabled Cap 2 capability on the carrier of the cell, all data received and transmitted by the terminal on the carrier are processed according to a time required by Cap 1.

Therefore, processing capabilities applicable for the terminal processing different data on one carrier are enabled processing capabilities for the carrier, and cannot adapt to different data enabling different processing capabilities.

SUMMARY

In order to overcome the problems existing in related arts, the present disclosure provides a method and an apparatus for determining a processing capability applicable for target data, and a storage medium.

According to a first aspect according to embodiments of the disclosure, there is provided a method for determining a processing capability applicable for target data. The method includes: detecting capability indication information configured for characterizing a processing capability applicable for target data; determining the processing capability applicable for the target data based on the capability indication information.

According to a second aspect according to embodiments of the disclosure, there is provided a method for determining a processing capability applicable for target data. The method includes: determining capability indication information configured for characterizing a processing capability applicable for target data; transmitting the capability indication information.

According to a third aspect according to embodiments of the disclosure, there is provided an apparatus for determining a processing capability applicable for target data. The apparatus includes a processor and a memory. The memory is configured to: detect capability indication information configured for characterizing a processing capability applicable for target data; determine the processing capability applicable for the target data based on the capability indication information.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the disclosure as described in the appended claims.

Figure 1:
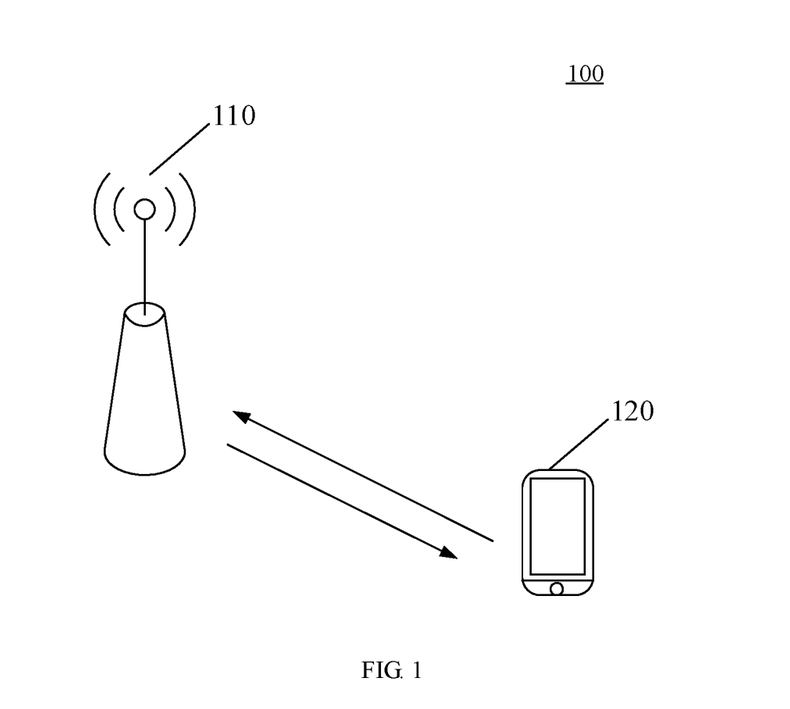
FIG. 1 is a schematic diagram illustrating a structure of a wireless communication system according to some exemplary embodiment.

A data transmission method provided by embodiments of the present disclosure may be applied to a wireless communication system 100 illustrated in FIG. 1. Referring to FIG. 1, the wireless communication system 100 includes a network device 110 and a terminal 120. The terminal 120 is connected with the network device 110 through a wireless resource and transmits and receives data.

It may be understood that the wireless communication system 100 illustrated in FIG. 1 is only a schematic description. The wireless communication system 100 may also include other network devices, such as core network devices, wireless relay devices, wireless backhaul devices, etc., which are not illustrated in FIG. 1. The embodiment of the present disclosure does not limit a quantity of network devices and terminals included in the wireless communication system.

It is further understood that the wireless communication system of embodiments of the present disclosure is a network for providing a wireless communication function. Wireless communication systems may use different communication technologies, such as code division multiple access (CDMA), broadband code division multiple access (WCDMA), time division multiple access (TDMA), frequency division multiple access (FDMA), orthogonal frequency-division multiple access (OFDMA), single carrier frequency division multiple access (SC-FDMA), carrier sense multiple access with collision avoidance. The networks may be divided into 2G (generation) network, 3G network, 4G network or future evolution network, such as 5G network, which is also referred to as New Radio (NR), depending on capability, rate and delay of different networks. For convenience of description, wireless communication networks are sometimes referred to as networks in this disclosure.

Further, the network device 110 in this disclosure may also be referred to as a wireless access network device. The wireless access network device may be a base station, an evolved base station (evolved node B, base station), a home eNode B, and an access point (AP), a wireless relay node, a wireless backhaul node, a transmission point (TP), or a transmission and reception point (TRP) in a wireless fidelity (WIFI) system. The wireless access network device may also be a gNB in an NR system, or a component or some devices that forms the base station, etc. It should be understood that there are no limitation on specific technologies and specific device configurations adopted by the network device in the present disclosure. In this disclosure, the network devices may provide communication coverage for a specific geographic area and may communicate with terminals located within the coverage area (cell).

Further, the terminal 120 in this disclosure, also referred to as a terminal device, a user equipment (UE), a mobile station (MS), a mobile terminal (MT), etc., is a device for provides voice and/or data connectivity to users. For example, the terminal may be a handheld device, an on-board device, etc. with wireless connection function. Currently, some examples of terminals are: a smartphone (Mobile Phones), a pocket personal computer (PPC), a palm computer, a personal digital assistants (PDA), a laptop PC, a tablet PC, a wearable device, or an on-board device. In addition, for an Internet of Vehicles (V2X) communication system, the terminal device may also be an on-board device. It should be understood that there are no limitation on specific technologies and specific device configurations adopted by the terminal in the present disclosure.

Referring to FIG. 1, the terminal 120 communicates with the network device 110, and data transmitted by the terminal 120 to the network device 110 is referred to as uplink data, such as a physical uplink shared channel (PUSCH). Data transmitted by the network device 110 to the terminal 120 is referred to as downlink data, such as a physical downlink Shared channel (PDSCH). The terminal 120 is required to process data when transmitting the uplink data or receiving the downlink data. For example, the terminal 120 is required to prepare the uplink data when transmitting the uplink data, and to demodulate the downlink data when receiving the downlink data. Different capacities for processing the uplink data/downlink data (PUSCH/PDSCH) by the terminal 120 cause different times (in symbols) required for processing PDSCH/PUSCH. When the terminal 120 has a relatively quick processing speed when processing the PDSCH/PUSCH according to a Cap 2 capability and has a relatively slow processing speed when processing the PDSCH/PUSCH according to a Cap 1 capability. In related arts, the processing capability adopted by the terminal when processing the PUSCH/PDSCH is a processing capability enabled towards one carrier, that is, a same processing capability is adopted for different PUSCH/PDSCHs on one carrier. However, different PUSCH/PDSCHs on a single carrier will be applied with different processing capabilities. For example, in a 5G NR, for a same terminal, an ultra reliable and low latency communication (URLLC) service is mixed with an enhanced mobile broadband (eMBB) service on one carrier, and the eMBB service generally uses a processing time corresponding to the Cap1 since it does not require ultra low latency, while the URLLC service requires to use a processing time corresponding to the Cap2 in order to meet a low latency characteristic of the URLLC service. However, the exiting arts do not support scenes where different PDSCH/PUSCHs are applied with different processing capabilities for a UE on one carrier.

In view of this, the present disclosure provides a method for determining a processing capability applicable for target data. In this method, an applicable processing capability is indicated for target data to be processed, to enable different target data applicable with different processing capabilities.

Target data in this disclosure may be understood as data to be processed, which may be either uplink data or downlink data. Processing the uplink data using a processing capability applicable for the target data may be preparing the uplink data. Processing the downlink data using a processing capability applicable for the target data may be demodulating the downlink data.

The present disclosure describes a method for determining a processing capability applicable for target data below.

Figure 2:
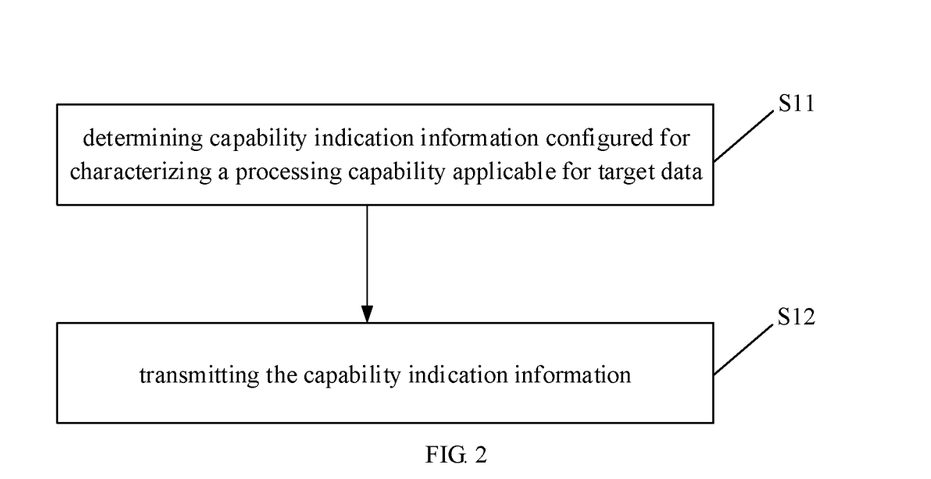
FIG. 2 is a flow chart illustrating a method for determining a processing capability applicable for target data according to another exemplary embodiment.

FIG. 2 is a flow chart illustrating a method for determining a processing capability applicable for target data according to an exemplary embodiment. As illustrated in FIG. 2, the method for determining the processing capability applicable for the target data is applied to a network device, and includes the following block S11 and block S12.

At block S11, capability indication information configured for characterizing a processing capability applicable for target data is determined.

At block S12, the capability indication information is transmitted.

In the present disclosure, the network device determines the capability indication information characterizing the processing capability applicable for the target data, and transmits the capability indication information; such that a terminal received the capability indication information may determine the processing capability applicable for the target data according to the capability indication information.

Figure 3:
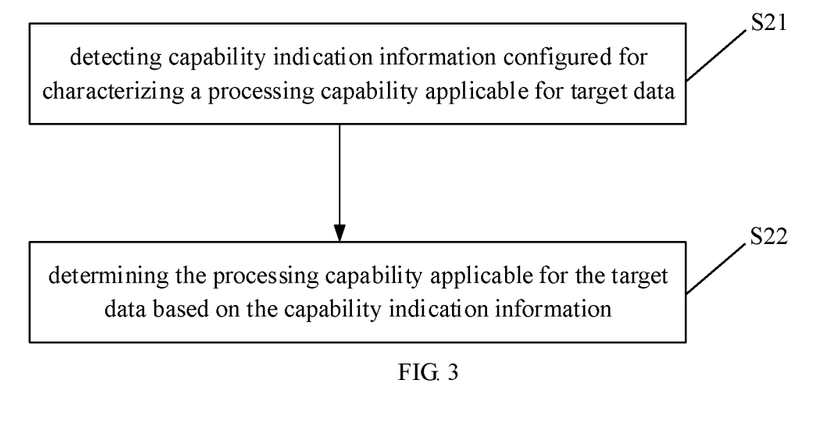
FIG. 3 is a flow chart illustrating a method for determining a processing capability applicable for target data according to also another exemplary embodiment.

FIG. 3 is a flow chart illustrating a method for determining a processing capability applicable for target data according to an exemplary embodiment. As illustrated in FIG. 3, the method for determining the processing capability applicable for the target data is applied to a terminal, and includes the following block S21 and block S22.

At block S21, capability indication information configured for characterizing a processing capability applicable for target data is detected.

At block S22, the processing capability applicable for the target data is determined based on the capability indication information characterizing the processing capability applicable for the target data.

In the present disclosure, the capability indication information characterizes the processing capability applicable for the target data. The terminal detects the capability indication information and determines the processing capability for processing the target data based on the detected capability indication information. The processing capability is the processing capability applicable for the target data. Therefore, different processing capabilities are respectively determined for different target data processed by the same terminal on one carrier.

The present disclosure will describe the method for determining the processing capability applicable for the target data in combination with practical applications.

In one embodiment, for dynamically scheduled target data, different processing capabilities applicable for the target data are distinguished by a physical layer indication signaling. In other words, the capability indication information of the present disclosure may be the physical layer indication signaling.

In an example, the capability indication information is preset attribute information of the physical layer indication signaling. The preset attribute information has a preset correspondence with one or more of the processing capabilities for processing the target data by the terminal, and different processing capabilities are distinguished through the attribute information of the physical layer instruction signaling.

The attribute information of the physical layer instruction signaling having the preset correspondence with the processing capability may be understood as indicating the processing capability through the attribute information of the physical layer instruction signaling.

In the present disclosure, the correspondence between the attribute information of the physical layer instruction signaling and the processing capability may be either explicit or implicit. For convenience of description, in the present disclosure, a processing capability having an explicit correspondence with the preset attribute information of the physical layer indication signaling is referred to as a first processing capability. A processing capability having an implicit correspondence with the preset attribute information of the physical layer indication signaling is referred to as a second processing capability. The second processing capability is a processing capability different from the first processing capability.

In an example, the processing capability for processing the target data by the terminal includes CAP1 and CAP2. When the preset attribute information of the physical layer indication signaling has a correspondence with CAP1, other attribute information of the physical layer indication signaling has an implicit correspondence with CAP2. Alternatively, when the preset attribute information of the physical layer indication signaling has a correspondence with CAP2, other attribute information of the physical layer indication signaling has an implicit correspondence with CAP1.

In an implementation, the first processing capability is CAP2.

Figure 4:
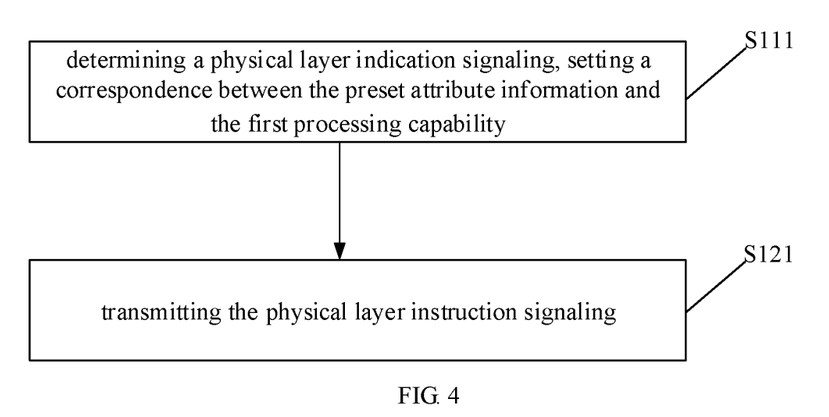
FIG. 4 is a flow chart illustrating a method for determining a processing capability applicable for target data according to yet another exemplary embodiment.

FIG. 4 is a flow chart illustrating a method for determining a processing capability applicable for target data according to an exemplary embodiment. As illustrated in FIG. 4, the method for determining the processing capability applicable for the target data is applied to the network device, and includes the following block S111 and block S121.

At block S111, the physical layer indication signaling is determined.

In the present disclosure, the network device determines that the capability indication information is the preset attribute information of the physical layer indication signaling, and sets the correspondence between the preset attribute information and the first processing capability.

At block S121, the physical layer instruction signaling is transmitted.

Figure 5:
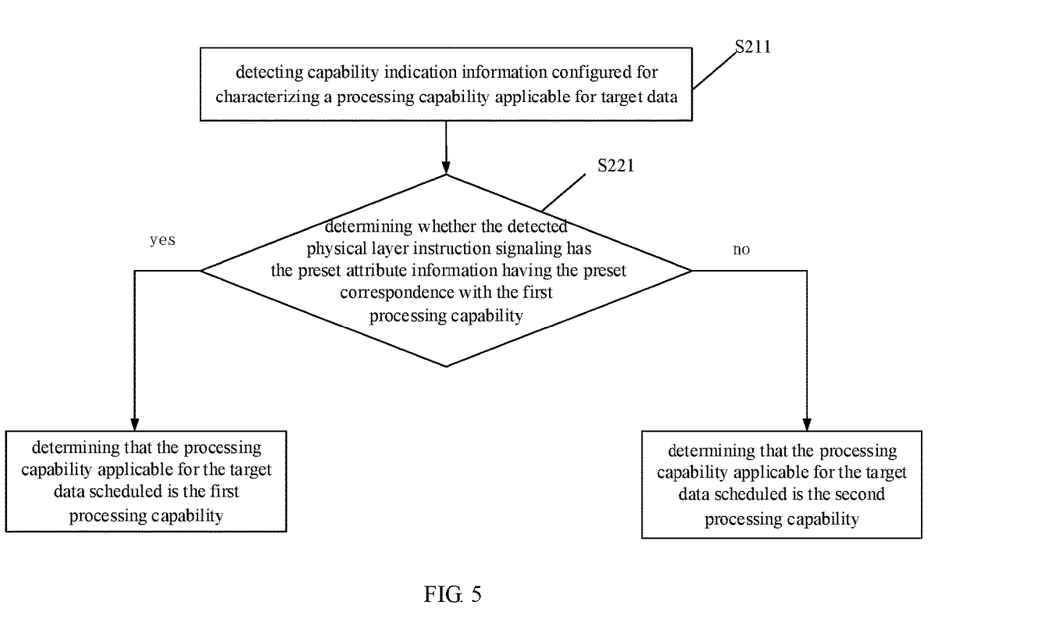
FIG. 5 is a flow chart illustrating a method for determining a processing capability applicable for target data according to yet another exemplary embodiment.

FIG. 5 is a flow chart illustrating a method for determining a processing capability applicable for target data according to an exemplary embodiment. As illustrated in FIG. 5, the method for determining the processing capability applicable for the target data is applied to the terminal, and includes the following block S211 and block S221.

At block S211, the physical layer indication signaling is detected.

The terminal detects the physical layer indication signaling, and may determine the processing capability applicable for the target data based on the preset attribute information of the physical layer indication signaling.

At block S221, it is determined whether the detected physical layer instruction signaling has the preset attribute information having the preset correspondence with the first processing capability.

In the present disclosure, in response to the detected physical layer indication signaling having the preset attribute information with the preset correspondence with the first processing capability, it is determined that the processing capability applicable for the target data scheduled by the physical layer indication information is the first processing capability. In response to the detected physical layer indication signaling not having the preset attribute information, with the preset correspondence with the first processing capability, it is determined that the target data scheduled by the physical layer indication information applies with the second processing capability.

In an embodiment, the physical layer indication signaling for the dynamically scheduled target data in the present disclosure may be downlink control information (DCI). For convenience of description, DCI with the preset attribute information and a preset correspondence between the preset attribute information and the first processing capability is called first DCI.

In the present disclosure, attribute information of the first DCI is one of a DCI format, a radio network temporary identity (RNTI) used by the DCI, one or more information fields of the DCI, and a control resource set (CORESET) to which a resource occupied by the DCI belongs, and a search space to which the resource occupied by the DCI belongs.

For an aspect, in the present disclosure, the DCI format of the first DCI characterizes different processing capabilities applicable for data scheduled by the first DCI. For example, when there is a preset correspondence between a certain preset DCI format of the first DCI and the first processing capability, the preset DCI format characterizes that the processing capability applicable for the target data is the first processing capability, and other DCI format other than the preset DCI format characterizes that the processing capability applicable for the target data is the second processing capability. For example, a specific DCI format characterizes that a PDSCH of the Cap 2 is scheduled, and other DCI format characterizes that a PDSCH of the Cap 1 is scheduled.

For another aspect, in the present disclosure, the RNTI used in the first DCI characterizes the different processing capabilities applicable for the data scheduled by the first DCI. For example, when there is a preset correspondence between a preset type of RNTI used in the first DCI and the first processing capability, the preset type of RNTI characterizes that the processing capability applicable for the target data is the first processing capability, and other type of RNTI other than the preset type of RNTI characterizes that the processing capability applicable for the target data is the second processing capability. In an example, the RNTI used in the first DCI characterizes whether a processing capability applicable for the scheduled PDSCH/PUSCH is Cap 1 or Cap 2. For example, when a specific type of RNTI is used in the first DCI, the processing capability applicable for the PDSCH/PUSCH scheduled by the first DCI is Cap 2. When other type of RNTI is used in the first DCI, the processing capability applicable for the PDSCH/PUSCH scheduled by the first DCI is Cap 1. In an example, for example, when modulation and coding scheme (MCS)-RNTI is used in the first DCI, it represents that the processing capability applicable for the PDSCH/PUSCH scheduled by the first DCI is Cap 2. When other RNTI other than the MCS-RNTI is used in the first DCI, it represents that the processing capability applicable for the PDSCH/PUSCH scheduled by the first DCI is Cap 1.

For yet another aspect, in the present disclosure, one information field or a combination of multiple information fields in the first DCI used in the first DCI characterizes the different processing capabilities applicable for the data scheduled by the first DCI. For example, when there is a preset correspondence between a preset information field value of a preset information field in the first DCI and the first processing capability, the preset information field value of the preset information field characterizes that the processing capability applicable for the target data is the first processing capability, and other information field value other than the preset information field value characterizes that the processing capability applicable for the target data is the second processing capability. Alternatively, when there is a preset correspondence between a preset information field value of a combination of several preset information fields in the first DCI and the first processing capability, the foregoing preset state characterizes that the processing capability applicable for the target data is the first processing capability, and other information field value other than the preset information field value characterizes that the processing capability applicable for the target data is the second processing capability. For example, one information field in the first DCI characterizes Cap 1 and Cap 2. An information field value of the information field indicates that whether the processing capability applicable for the PDSCH/PUSCH scheduled by the first DCI is Cap 1 or Cap 2. Alternatively, a combination of several information fields in the first DCI characterizes Cap 1 and Cap 2. When the combination of the several information fields has a specific information field value, it represents that the processing capability applicable for the PDSCH/PUSCH scheduled by the first DCI is Cap 2. An information field value corresponding to other combination represents that the processing capability applicable for the PDSCH/PUSCH scheduled by the first DCI is Cap 1.

For yet another aspect, in the present disclosure, the CORESET/search space to which the resource occupied by the first DCI belongs characterizes the different processing capabilities applicable for the PDSCH/PUSCH scheduled by the first DCI. For example, the network device configures a specific CORESET/search for the terminal in the radio resource control (RRC) layer, and the specific CORESET/search has a preset corresponding relationship with the first processing capability. Thus, when the resource occupied by the first DCI belongs to the specific CORESET/search, it represents that the processing capability applicable for the target data scheduled by the first DCI is the first processing capability. When the resource occupied by the first DCI belongs to other CORESET/search other than the specific CORESET/search, it represents that the processing capability applicable for the target data scheduled by the first DCI is the second processing capability. For example, when the resource occupied by the first DCI belongs to the specific CORESET/search, it represents that the processing capability applicable for the PDSCH/PUSCH scheduled by the first DCI is Cap 2. When the resource occupied by the first DCI does not belong to the specific CORESET/search, it represents that the processing capability applicable for the PDSCH/PUSCH scheduled by the first DCI is Cap 1.

For yet another aspect, in the present disclosure, the processing capability applicable for the PDSCH/PUSCH scheduled by the first DCI is indicated by a combination of at least two of the DCI format of the first DCI, the RNTI used in the first DCI, one information field or a combination of multiple information fields in the first DCI, and CORESET/search space to which the first DCI belongs. For example, in the present disclosure, a processing capability applicable for the PDSCH/PUSCH scheduled by the first DCI with a specific CORESET resource carrying and a specific DCI format is Cap2, and others are Cap 1. When the resource occupied by the first DCI belongs to the specific CORESET and the DCI format of the first DCI is the specific DCI format, it is determined that the processing capability applicable for the PDSCH/PUSCH scheduled by the first DCI is Cap2. When the resource occupied by the first DCI does not belong to the specific CORESET, or the DCI format of the first DCI is not the specific DCI format, it is determined that the processing capability applicable for the PDSCH/PUSCH scheduled by the first DCI is Cap1. For another example, the processing capability applicable for the PDSCH/PUSCH scheduled by the DCI with a specific RNTI and the specific DCI format is Cap2, and others are Cap 1. When the first DCI uses the specific RNTI and the DCI format of the first DCI is the specific DCI format, it is determined that the processing capability applicable for the PDSCH/PUSCH scheduled by the first DCI is Cap2. When the RNTI used by the first DCI is not the specific RNTI, or the DCI format of the first DCI is not the specific DCI format, it is determined that the processing capability applicable for the PDSCH/PUSCH scheduled by the first DCI is Cap1. For another example, in the present disclosure, a processing capability applicable for the PDSCH/PUSCH scheduled by the first DCI with the specific CORESET resource carrying and the specific RNTI is Cap2, and others are Cap 1. When the resource occupied by the first DCI belongs to the specific CORESET and the first DCI uses the specific RNTI, it is determined that the processing capability applicable for the PDSCH/PUSCH scheduled by the first DCI is Cap2. When the resource occupied by the first DCI does not belong to the specific CORESET, or the RNTI used by the first DCI is not the specific RNTI, it is determined that the processing capability applicable for the PDSCH/PUSCH scheduled by the first DCI is Cap1.

In another embodiment, in the present disclosure, for target data transmitted by a semi-persistent configured resource, when there are semi-persistent configured resources of multiple cycle periods configured in a RRC, a correspondence between the semi-persistent configured resource and the processing capability is set for the semi-persistent configured resource configured in each cycle period. The capability indication information is the semi-persistent configured resource configured by the RRC, and the semi-persistent configured resource with the correspondence with the processing capability indicates the processing capability applicable for the target data.

In the present disclosure, the RRC configuring the correspondence between semi-persistent configured resource and the processing capability is referred to as a first RRC.

Figure 6:
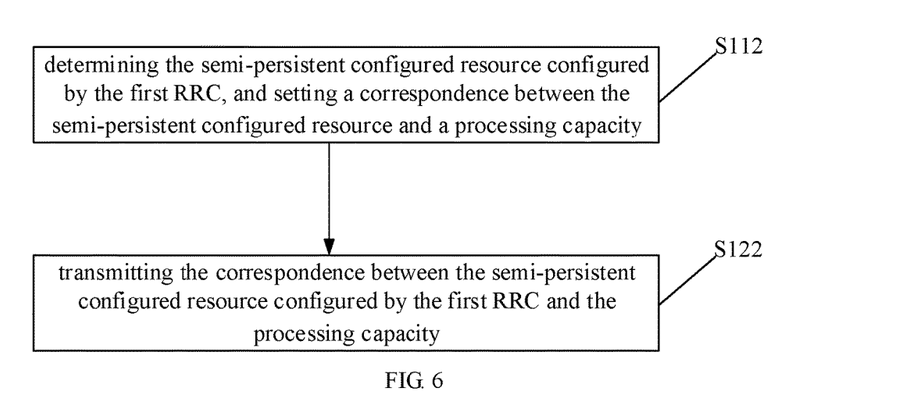
FIG. 6 is a flow chart illustrating a method for determining a processing capability applicable for target data according to yet another exemplary embodiment.

FIG. 6 is a flow chart illustrating a method for determining a processing capability applicable for target data according to an exemplary embodiment. As illustrated in FIG. 6, the method for determining the processing capability applicable for the target data is applied to the network device, and includes the following block S112 and block S122.

At block S112, the semi-persistent configured resource configured by the first RRC is determined, and a correspondence between the semi-persistent configured resource and a processing capability is set.

At block S122, the correspondence between the semi-persistent configured resource configured by the first RRC and the processing capability is transmitted.

Figure 7:
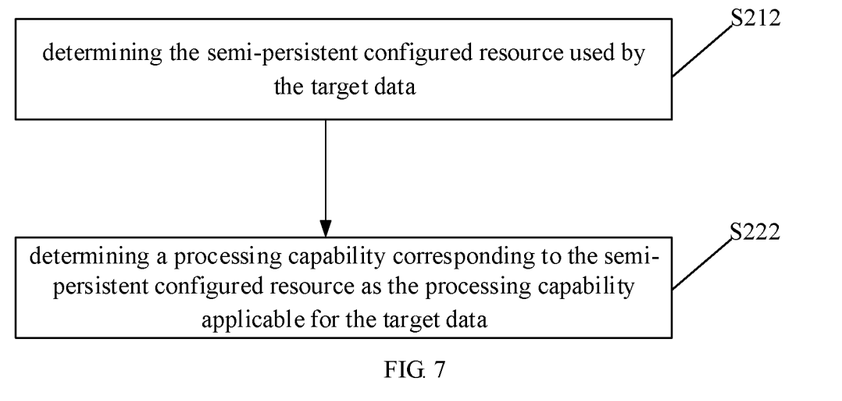
FIG. 7 is a flow chart illustrating a method for determining a processing capability applicable for target data according to yet another exemplary embodiment.

FIG. 7 is a flow chart illustrating a method for determining a processing capability applicable for target data according to an exemplary embodiment. As illustrated in FIG. 7, the method for determining the processing capability applicable for the target data is applied to the terminal, and includes the following block S212 and block S222.

At block S212, the semi-persistent configured resource used by the target data is determined.

At block S222, a processing capability corresponding to the semi-persistent configured resource is determined as the processing capability applicable for the target data.

In the present disclosure, for semi-persistent configured PDSCH/PUSCH, the processing capability corresponding to the semi-persistent configured resource is configured when the semi-persistent configured resources of PDSCH/PUSCH is directly configured in the RRC. When a PDSCH/PUSCH uses the above semi-persistent configured resource with the corresponding processing capability, the PDSCH/PUSCH applies with the processing capability set by RRC for the semi-persistent configured resource.

In another embodiment, for the target data transmitted by the semi-persistent configured resource in the present disclosure, when there are semi-persistent configured resources of multiple cycles configured in the RRC, a correspondence between a quantity of time domain symbols and the processing capability, or a correspondence between a bandwidth of frequency domain resource and the processing capability is set for each cycle of the semi-persistent configured resource. The DCI is configured to indicate the quantity of time domain symbols or the bandwidth of frequency domain resource of the semi-persistent configured resource used by the target data, so as to realize indication of the processing capability applicable for the target data. For example, when the quantity of time domain symbols is set to be greater than 4 symbols in the present disclosure, the processing capability applicable for the target data is CAP2. When the quantity of time domain symbols is less than 4, the processing capability applicable for the target data is CAP1. Or when the bandwidth of frequency domain resource is set to be greater than a set bandwidth, the processing capability applicable for the target data is CAP1.

In the present disclosure, DCI indicating the quantity of time domain symbols or the bandwidth of frequency domain resource of the semi-persistent configured resource used by the target data is referred to as second DCI.

Figure 8:
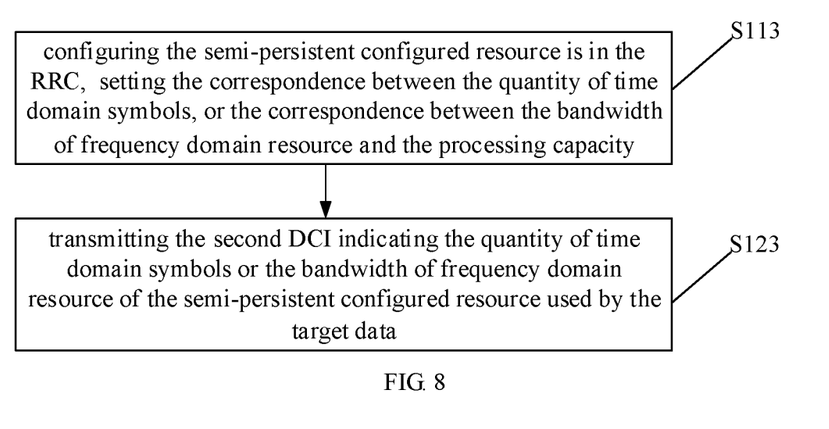
FIG. 8 is a flow chart illustrating a method for determining a processing capability applicable for target data according to yet another exemplary embodiment.

FIG. 8 is a flow chart illustrating a method for determining a processing capability applicable for target data according to an exemplary embodiment. As illustrated in FIG. 8, the method for determining the processing capability applicable for the target data is applied to the network device, and includes the following block S113 and block S123.

At block S113, the semi-persistent configured resource is configured in the RRC. The correspondence between the quantity of time domain symbols and the processing capability, or the correspondence between the bandwidth of frequency domain resource and the processing capability is set.

At block S123, the second DCI is transmitted indicating the quantity of time domain symbols or the bandwidth of frequency domain resource of the semi-persistent configured resource used by the target data.

Figure 9:
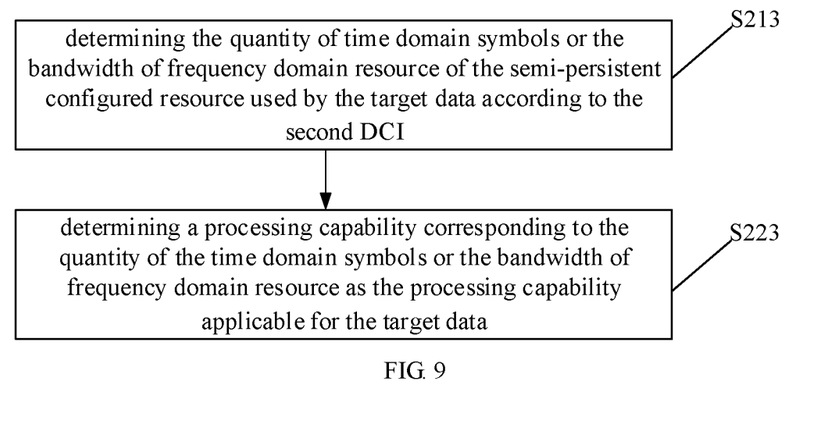
FIG. 9 is a flow chart illustrating a method for determining a processing capability applicable for target data according to yet another exemplary embodiment.

FIG. 9 is a flow chart illustrating a method for determining a processing capability applicable for target data according to an exemplary embodiment. As illustrated in FIG. 9, the method for determining the processing capability applicable for the target data is applied to the terminal, and includes the following block S213 and block S223.

At block S213, the second DCI is obtained, and the quantity of time domain symbols or the bandwidth of frequency domain resource of the semi-persistent configured resource used by the target data is determined according to the second DCI.

At block S223, a processing capability corresponding to the quantity of the time domain symbols or the bandwidth of frequency domain resource is determined as the processing capability applicable for the target data.

Figure 10:
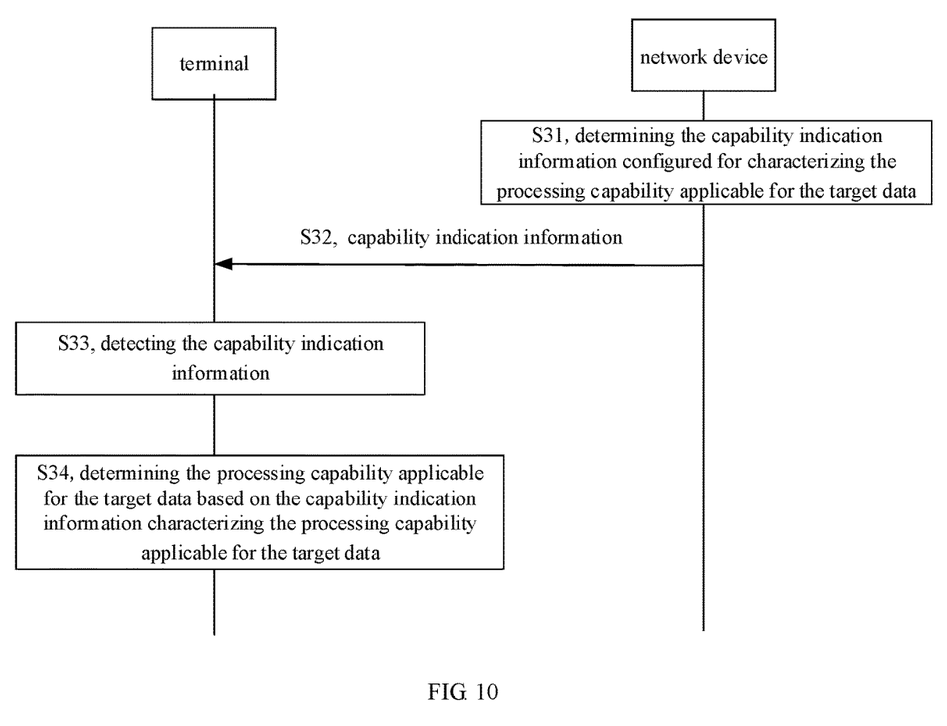
FIG. 10 is a flow chart illustrating a method for determining a processing capability applicable for target data according to yet another exemplary embodiment.

FIG. 10 is a flow chart illustrating a method for determining a processing capability applicable for target data according to an exemplary embodiment. As illustrated in FIG. 10, the method for determining the processing capability applicable for the target data is a flow chart of interaction between the terminal and the network device, and includes the following block S31 to block S34.

At block S31, the network device determines the capability indication information configured for characterizing the processing capability applicable for the target data.

In an embodiment, the target data is the data dynamically scheduled by the physical layer indication signaling, the capability indication information is the preset attribute information of the physical layer indication signaling, and the preset attribute information has the preset correspondence with the first processing capability.

The physical layer indication signaling is the first DCI. The attribute information in the first DCI having the preset correspondence with the first processing capability includes at least one of the DCI format, the radio network temporary identity used in the DCI, one or more information fields of the DCI, and the control resource set to which the resource occupied by the DCI belongs, and the search space to which the resource occupied by the DCI belongs In another embodiment, the target data is the data transmitted by the semi-persistent configured resource, the capability indication information includes the semi-persistent configured resource configured by the first RRC signaling, and the semi-persistent configured resource has the preset correspondence with the processing capability.

In another embodiment, the target data is the data transmitted by the semi-persistent configured resource, the capability indication information includes second DCI, and the second DCI is configured to indicate the quantity of time domain symbols or the bandwidth of frequency domain resource of the semi-persistent configured resource used by the target data. The quantity of time domain symbols has the preset correspondence with the processing capability, or the bandwidth of frequency domain resource has the preset correspondence with the processing capability.

At block S32, the network device transmits the capability indication information characterizing the processing capability applicable for the target data.

At block S33, the terminal detects the capability indication information characterizing the processing capability applicable for the target data.

At block S34, the terminal determines the processing capability applicable for the target data based on the capability indication information characterizing the processing capability applicable for the target data.

In an embodiment, the terminal determines that target data scheduled by the physical layer indication information applies with the first processing capability in response to the obtained physical layer indication signaling having the preset attribute information. The terminal determines the target data scheduled by the physical layer indication information applies with the second processing capability different from the first processing capability in response to the obtained physical layer indication signaling not having the preset attribute information.

In another embodiment, the terminal determines the semi-persistent configured resource used by the target data, and determines the processing capability corresponding to the semi-persistent configured resource as the processing capability applicable for the target data.

In yet another embodiment, the terminal determines the quantity of the time domain symbols or the bandwidth of frequency domain resource of the semi-persistent configured resource used by the target data according to the second DCI, and determines the processing capability corresponding to the quantity of the time domain symbols or the bandwidth of frequency domain resource as the processing capability applicable for the target data.

The method for determining the processing capability applicable for the target data provided by the present disclosure may realize determination of different processing capabilities applicable for different target data based on the capability indication information characterizing the processing capability applicable for the target data.

Based on the same concept, embodiments of the present disclosure also provide an apparatus for determining a processing capability applicable for target data.

It can be understood that the target data applicable processing capability determination device provided by the embodiment of the present disclosure includes include a hardware structure and/or a software module for performing each function. In combination with units and algorithm steps of the examples described in the embodiments disclosed in the present disclosure, the embodiments of the present disclosure may be implemented in a form of hardware or a combination of hardware and computer software. Whether a certain function is executed by the hardware or a manner of the computer software driving the hardware depends on specific applications and design constraint conditions of the technical solution. Those skilled in the art may use different methods for each specific application to implement the described functions, but such implementation should not be considered as going beyond the scope of the technical solution of the embodiments of the present disclosure.

Figure 11:
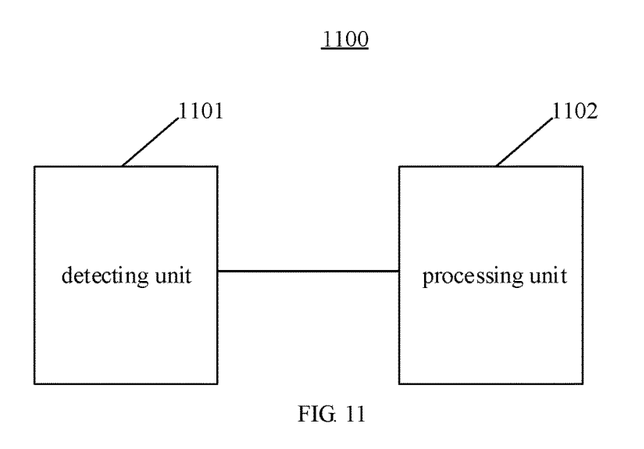
FIG. 11 is a block diagram illustrating an apparatus for determining a processing capability applicable for target data according to an exemplary embodiment.

FIG. 11 is a block diagram illustrating an apparatus 1100 for determining a processing capability applicable for target data according to an exemplary embodiment. The apparatus 1100 for determining the processing capability applicable for the target data is applied to a terminal. Referring to FIG. 11, the apparatus 1100 for determining the processing capability applicable for the target data includes a detecting unit 1101 and a processing unit 1102.

The detecting unit 1101 is configured to detect capability indication information configured for characterizing a processing capability applicable for target data. The processing unit 1102 is configured to determine the processing capability applicable for the target data based on the capability indication information.

In an embodiment, the target data is data dynamically scheduled by a physical layer indication signaling, the capability indication information is preset attribute information of the physical layer indication signaling, and the preset attribute information has a preset correspondence with a first processing capability.

The processing unit 1102 is configured to determine the processing capability applicable for the target data based on the capability indication information in the following operations: in response to the obtained physical layer indication signaling having the preset attribute information, determining that target data scheduled by the physical layer indication information applies with the first processing capability; in response to the obtained physical layer indication signaling not having the preset attribute information, determining that the target data scheduled by the physical layer indication information applies with a second processing capability different from the first processing capability.

In another embodiment, the physical layer indication signaling is first downlink control information (DCI). Attribute information in the first DCI having a preset correspondence with the first processing capability comprises at least one of a DCI format, a radio network temporary identity used in the DCI, one or more information fields of the DCI, and a control resource set to which a resource occupied by the DCI belongs, and a search space to which the resource occupied by the DCI belongs.

In also another embodiment, the target data is data transmitted by a semi-persistent configured resource, the capability indication information includes the semi-persistent configured resource configured by a first radio resource control (RRC) signaling, and the semi-persistent configured resource has a preset correspondence with a processing capability.

The processing unit 1102 is configured to determine the processing capability applicable for the target data based on the capability indication information in the following operations: determining a semi-persistent configured resource used by the target data; determining a processing capability corresponding to the semi-persistent configured resource as the processing capability applicable for the target data.

In yet another embodiment, the target data is data transmitted by a semi-persistent configured resource, the capability indication information includes second downlink control information (DCI), and the second DCI is configured to indicate a quantity of time domain symbols or a bandwidth of frequency domain resource of the semi-persistent configured resource used by the target data. The quantity of time domain symbols has a preset correspondence with a processing capability, or the bandwidth of frequency domain resource has a preset correspondence with a processing capability.

The processing unit 1102 is configured to determine the processing capability applicable for the target data based on the capability indication information in the following operations: determining the quantity of the time domain symbols or the bandwidth of frequency domain resource of the semi-persistent configured resource used by the target data according to the second DCI; determining a processing capability corresponding to the quantity of the time domain symbols or the bandwidth of frequency domain resource as the processing capability applicable for the target data.

Figure 12:
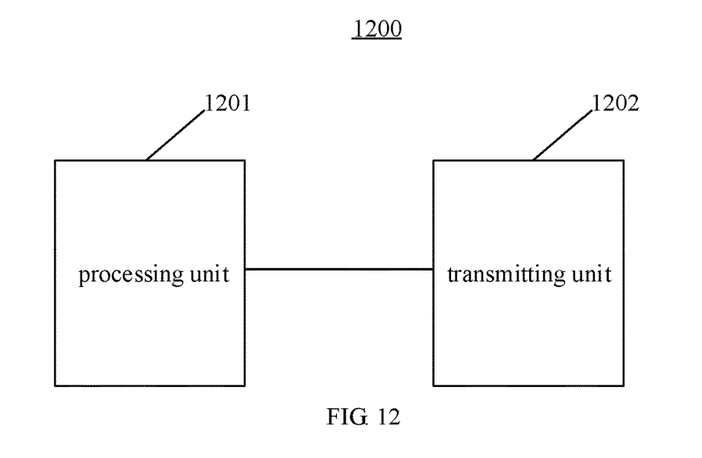
FIG. 12 is a block diagram illustrating an apparatus for determining a processing capability applicable for target data according to another exemplary embodiment.

FIG. 12 is a block diagram illustrating an apparatus 1200 for determining a processing capability applicable for target data according to an exemplary embodiment. The apparatus 1200 for determining the processing capability applicable for the target data is applied to a network device. Referring to FIG. 12, the apparatus 1200 for determining the processing capability applicable for the target data includes a processing unit 1201 and a transmitting unit 1202. The processing unit 1201 is configured to determine capability indication information configured for characterizing a processing capability applicable for target data. The transmitting unit 1202 is configured to transmit the capability indication information.

In an implementation, the target data is data dynamically scheduled by a physical layer indication signaling, the capability indication information is preset attribute information of the physical layer indication signaling, and the preset attribute information has a preset correspondence with a first processing capability.

In an implementation, the physical layer indication signaling is first DCI. Attribute information in the first DCI having a preset correspondence with the first processing capability includes at least one of a DCI format, a radio network temporary identity used in the DCI, one or more information fields of the DCI, and a control resource set to which a resource occupied by the DCI belongs, and a search space to which the resource occupied by the DCI belongs.

In another implementation, the target data is data transmitted by a semi-persistent configured resource, the capability indication information includes the semi-persistent configured resource configured by a first RRC signaling, and the semi-persistent configured resource has a preset correspondence with a processing capability.

In also another implementation, the target data is data transmitted by a semi-persistent configured resource, the capability indication information includes second DCI, and the second DCI is configured to indicate a quantity of time domain symbols or a bandwidth of frequency domain resource of the semi-persistent configured resource used by the target data. The quantity of time domain symbols has a preset correspondence with a processing capability, or the bandwidth of frequency domain resource has a preset correspondence with a processing capability.

With regard to the apparatus in the above embodiments, the specific way in which each module performs the operation has been described in detail in embodiments of the method and will not be elaborated here.

Figure 13:
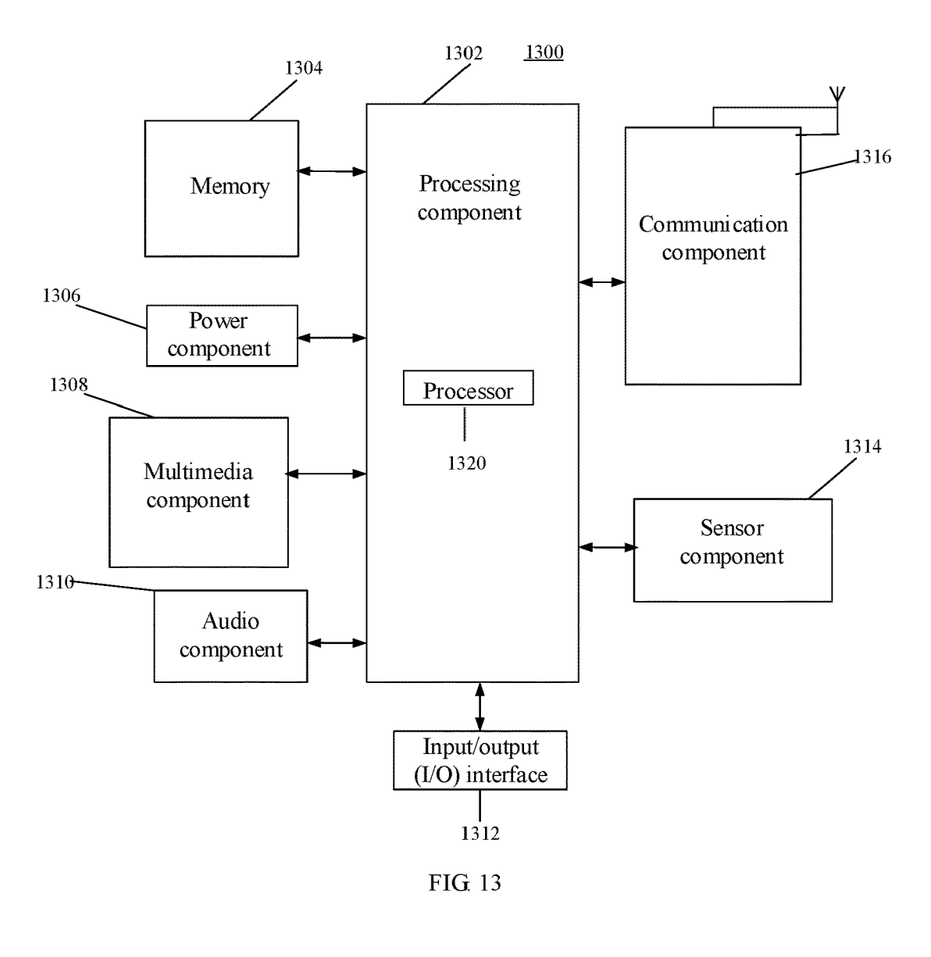
FIG. 13 is a block diagram illustrating an apparatus for determining a processing capability applicable for target data according to an exemplary embodiment.

FIG. 13 is a block diagram illustrating an apparatus for determining a processing capability applicable for target data according to an exemplary embodiment. For example, the apparatus 1300 may be a mobile phone, a computer, a digital broadcasting terminal, a messaging device, a game console, a tablet device, a medical equipment, a fitness equipment, a personal digital assistant, etc.

As illustrated in FIG. 13, the apparatus 1300 may include one or more components: a processing component 1302, a memory 1304, a power supply component 1306, a multimedia component 1308, an audio component 1310, an input/output (I/O) interface 1312, a sensor component 1314, and a communication component 1316.

The processing component 1302 generally controls the whole operation of the terminal 1300, such as the operations related to display, phone call, data communication, camera operation and recording operation. The processing component 1302 may include one or more processors 1320 to execute instructions, to complete all or part of blocks of the above methods. In addition, the processing component 1302 may include one or more modules for the convenience of interaction between the processing component 1302 and other components. For example, the processing component 1302 may include a multimedia module for the convenience of interaction between the multimedia component 1308 and the processing component 1302.

The memory 1304 is configured to store all types of data to support the operation of the terminal 1300. Examples of the data include the instructions of any applications or methods operated on terminal 1300, contact data, phone book data, messages, pictures, videos, etc. The memory 1304 may be implemented by any type of volatile or non-volatile storage devices or their combination, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a Magnetic Memory, a Flash Memory, a Magnetic Disk or an Optical Disk.

The power supply component 1306 may provide power supply for all components of the apparatus 1300. The power supply component 1306 may include a power supply management system, one or more power supplies, and other components related to generating, managing and distributing power for the apparatus 1300.

The multimedia component 1308 includes an output interface screen provided between the apparatus 1300 and the user. In some embodiments, a screen may include a liquid crystal display (LCD) and a touch panel (TP). If the screen includes a touch panel, the screen may be implemented as a touch screen to receive input signals from the user. The touch panel includes one or more touch sensors to sense touching, sliding and gestures on the touch panel. The touch sensor may not only sense the boundary of touching or sliding action, but also detect the duration and pressure related to the touching or sliding operation. In some embodiments, the multimedia component 1308 includes a front camera and/or a rear camera. When the apparatus 1300 is in operation mode, such as shooting mode or video mode, the front camera or the rear camera may receive the external multimedia data. Each front camera and rear camera may be a fixed optical lens system or an optical lens system with focal length and optical zoom capacity.

The audio component 1310 is configured as an output and/or input signal. For example, the audio component 1310 includes a microphone (MIC). When the apparatus 1300 is in operation mode, such as call mode, record mode, and speech recognition mode, the microphone is configured to receive external audio signals. The audio signals received may be further stored in the memory 1304 or sent via the communication component 1316. In some embodiments, the audio component 1310 further includes a speaker configured to an output audio signal.

An I/O interface 1310 provides an interface for the processing component 1302 and the peripheral interface module, in which the peripheral interface module may be a keyboard, click wheel, a button, etc. The buttons may include but not limited to a home button, a volume button, a start button and a lock button.

The sensor component 1314 includes one or more sensors, configured to provide various aspects of status assessment for the apparatus 1300. For example, the sensor component 1314 may detect the on/off state of the apparatus 1300 and the relative positioning of the component. For example, the component is a display and a keypad of the apparatus 1300. The sensor component 1314 may further detect the location change of the apparatus 1300 or one component of the apparatus 1300, the presence or absence of contact between the user and the apparatus 1300, the orientation or acceleration/deceleration of the apparatus 1300, and the temperature change of the apparatus 1300. The sensor component 1314 may include a proximity sensor, which is configured to detect the existence of the objects nearby without any physical contact. The sensor component 1314 may further include a light sensor such as a CMOS or CCD image sensor, which is configured to use in imaging applications. In some embodiments, the sensor component 1314 may further include an acceleration transducer, a gyroscope sensor, a magnetic sensor, a pressure sensor or a temperature sensor.

The communication component 1316 is configured for the convenience of wire or wireless communication between the apparatus 1300 and other devices. The apparatus 1300 may access wireless networks based on communication standard, such as Wi-Fi, 2G or 3G, or their combination. In an exemplary embodiment, the communication component 1316 receives broadcast signals or broadcast-related information from an external broadcast management system via a broadcast channel. In an exemplary embodiment, the communication component 1316 further includes a near field communication (NFC) module to facilitate short-range communication.

In an exemplary embodiment, the apparatus 1300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an exemplary embodiment, a non-temporary computer readable storage medium is further provided which includes instructions, such as the memory 1304 including instructions, in which the instructions may be executed by the processor 1320 of the apparatus 1300 to complete the above methods. For example, the non-temporary computer readable storage medium may be a ROM, a random access memory (RAM), a CD-ROM, a magnetic tape, a floppy disk, an optical data storage device, etc.

Figure 14:
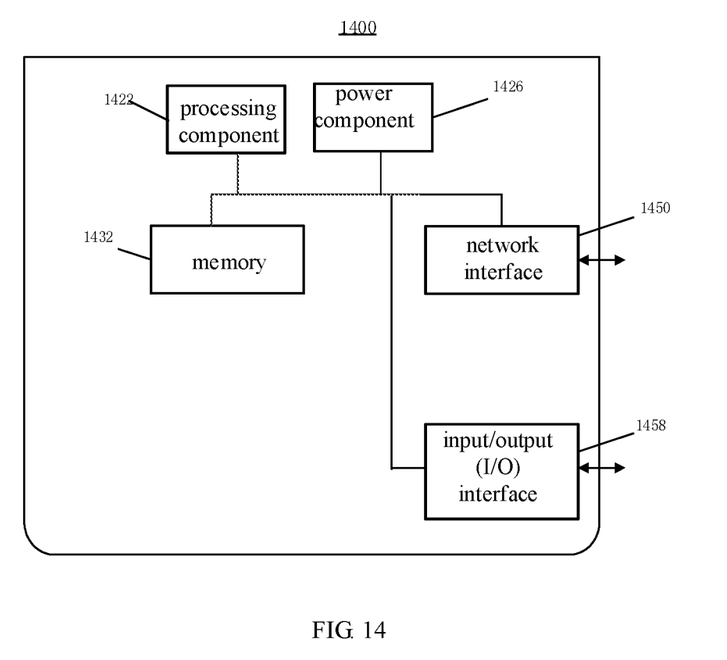
FIG. 14 is a block diagram illustrating an apparatus for determining a processing capability applicable for target data according to another exemplary embodiment.

FIG. 14 is a block diagram illustrating an apparatus 1400 for determining a processing capability applicable for target data according to another exemplary embodiment. For example, the apparatus 1400 may be provided as a server. Referring to FIG. 14, the apparatus 1400 includes a processing component 1422, which further includes one or more processors and memory resources represented by a memory 1432 for storing instructions executable by the processing component 1422, such as an application program. The application stored in the memory 1432 may include one or more modules, each corresponding to a set of instructions. Further, the processing component 1422 is configured to execute the instructions to execute the above method.

The apparatus 1400 may also include a power component 1426 configured to perform power management of the apparatus 1400, a wired or wireless network interface 1450 configured to connect the apparatus 1400 to the network, and an input/output (I/O) interface 1458. The apparatus 1400 may operate based on an operating system stored in the memory 1432, such as Windows Server™, Mac OS X™, Unix™, Linux™, FreeBSD™, or the like.

In an exemplary embodiment, a non-temporary computer-readable storage medium including instructions, such as a memory 1432 including instructions, which may be executed by the processing component 1422 of apparatus 1400 to complete the above method, is also provided. For example, the non-temporary computer-readable storage medium may be a ROM, a random access memory (RAM), a CD-ROM, a magnetic tape, a floppy disk, an optical data storage device, etc.

It can be further understood that "multiple" in the present disclosure refers to two or more, and other quantifiers are similar. "And/or" describes an association relationship between associated objects, indicating that there may be three relationships, for example, A and/or B may represent that there are three situations: A exists alone, A and B both exist, and B exists alone. The character "/" generally indicates that front and rear associated objects are an "or" relationship. The singular forms "an", "the" and "this" are also intended to include the majority forms unless the context clearly indicates other meanings.

It can be understood that in the embodiments of the present disclosure, although the operations are described in a specific order in the drawings, it should not be understood as requiring these operations to be performed in the specific order or serial order shown, or all the operations shown to obtain the desired results. Multitasking and parallel processing may be advantageous in a particular environment.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that, the disclosure is not limited to the exaction construction that has been described above and illustrated in the accompanying drawings, and that various modifications and changes may be made without departing from the scope thereof. The scope of the disclosure only is limited by the appended claims.

What is claimed is:

1. A method for determining a processing capability applicable for target data, comprising:
    detecting capability indication information configured for characterizing the processing capability applicable for the target data; and
    determining the processing capability applicable for the target data based on the capability indication information;
    wherein the target data is data transmitted by a semi-persistent configured resource, the capability indication information comprises the semi-persistent configured resource configured by a first radio resource control (RRC) signaling, the semi-persistent configured resource has a preset correspondence with a processing capability, wherein determining the processing capability applicable for the target data based on the capability indication information comprises: determining a semi-persistent configured resource used by the target data; and determining a processing capability corresponding to the semi-persistent configured resource as the processing capability applicable for the target data; or
    the target data is data transmitted by a semi-persistent configured resource, the capability indication information comprises second downlink control information (DCI), the second DCI is configured to indicate a quantity of time domain symbols or a bandwidth of frequency domain resource of the semi-persistent configured resource used by the target data; wherein the quantity of time domain symbols has a preset correspondence with a processing capability, or the bandwidth of frequency domain resource has a preset correspondence with a processing capability; wherein determining the processing capability applicable for the target data based on the capability indication information comprises: determining the quantity of the time domain symbols or the bandwidth of frequency domain resource of the semi-persistent configured resource used by the target data according to the second DCI; and determining a processing capability corresponding to the quantity of the time domain symbols or the bandwidth of frequency domain resource as the processing capability applicable for the target data; or
    the target data is data dynamically scheduled by a physical layer indication signaling, the capability indication information is preset attribute information of the physical layer indication signaling, the physical layer indication signaling is first downlink control information (DCI), and attribute information in the first DCI having a preset correspondence with the first processing capability comprises at least one of a DCI format, a radio network temporary identity used in the DCI, one or more information fields of the DCI, and a control resource set to which a resource occupied by the DCI belongs, and a search space to which the resource occupied by the DCI belongs.

2. The method of claim 1, wherein the capability indication information is the preset attribute information of the physical layer indication signaling, and the preset attribute information has a preset correspondence with a first processing capability;
    wherein determining the processing capability applicable for the target data based on the capability indication information comprises:
    in response to the physical layer indication signaling having the preset attribute information, determining that target data scheduled by the physical layer indication information applies with the first processing capability; or
    in response to the obtained physical layer indication signaling not having the preset attribute information, determining that the target data scheduled by the physical layer indication information applies with a second processing capability different from the first processing capability.

3. A method for determining a processing capability applicable for target data, comprising:
    determining capability indication information configured for characterizing the processing capability applicable for the target data; and
    transmitting the capability indication information;
    wherein the target data is data transmitted by a semi-persistent configured resource, the capability indication information comprises the semi-persistent configured resource configured by a first radio resource control (RRC) signaling, and the semi-persistent configured resource has a preset correspondence with a processing capability; or
    the target data is data transmitted by a semi-persistent configured resource, the capability indication information comprises second downlink control information (DCI), and the second DCI is configured to indicate a quantity of time domain symbols or a bandwidth of frequency domain resource of the semi-persistent configured resource used by the target data, the quantity of time domain symbols has a preset correspondence with a processing capability, or the bandwidth of frequency domain resource has a preset correspondence with a processing capability; or
    the target data is data dynamically scheduled by a physical layer indication signaling, the capability indication information is preset attribute information of the physical layer indication signaling, the physical layer indication signaling is first downlink control information (DCI), attribute information in the first DCI having a preset correspondence with the first processing capability comprises at least one of a DCI format, a radio network temporary identity used in the DCI, one or more information fields of the DCI, and a control resource set to which a resource occupied by the DCI belongs, and a search space to which the resource occupied by the DCI belongs.

4. The method of claim 3, wherein the capability indication information is the preset attribute information of the physical layer indication signaling, and the preset attribute information has a preset correspondence with a first processing capability.

5. An apparatus for determining a processing capability applicable for target data, comprising:
    a processor; and
    a memory, configured to store instructions executable by the processor,
    wherein the processor is configured to implement the method for determining the processing capability applicable for target data according to claim 3.

6. An apparatus for determining a processing capability applicable for target data, comprising:
    a processor; and
    a memory, configured to store instructions executable by the processor, wherein the processor is configured to:
detect capability indication information configured for characterizing the processing capability applicable for target data; and
determine the processing capability applicable for the target data based on the capability indication information;
wherein the target data is data transmitted by a semi-persistent configured resource, the capability indication information comprises the semi-persistent configured resource configured by a first radio resource control (RRC) signaling, and the semi-persistent configured resource has a preset correspondence with a processing capability, wherein the processor is configured to: determine a semi-persistent configured resource used by the target data, and determine a processing capability corresponding to the semi-persistent configured resource as the processing capability applicable for the target data; or
the target data is data transmitted by a semi-persistent configured resource, the capability indication information comprises second downlink control information (DCI), and the second DCI is configured to indicate a quantity of time domain symbols or a bandwidth of frequency domain resource of the semi-persistent configured resource used by the target data, wherein the quantity of time domain symbols has a preset correspondence with a processing capability, or the bandwidth of frequency domain resource has a preset correspondence with a processing capability, wherein the processor is configured to determine the quantity of the time domain symbols or the bandwidth of frequency domain resource of the semi-persistent configured resource used by the target data according to the second DCI, and determine a processing capability corresponding to the quantity of the time domain symbols or the bandwidth of frequency domain resource as the processing capability applicable for the target data; or
the target data is data dynamically scheduled by a physical layer indication signaling, the capability indication information is preset attribute information of the physical layer indication signaling, the physical layer indication signaling is first downlink control information (DCI), attribute information in the first DCI having a preset correspondence with the first processing capability comprises at least one of a DCI format, a radio network temporary identity used in the DCI, one or more information fields of the DCI, and a control resource set to which a resource occupied by the DCI belongs, and a search spaces to which the resource occupied by the DCI belongs.

7. The apparatus of claim 6, wherein the capability indication information is the preset attribute information of the physical layer indication signaling, and the preset attribute information has a preset correspondence with a first processing capability;
wherein the processor is configured to:
in response to the physical layer indication signaling having the preset attribute information, determine that target data scheduled by the physical layer indication information applies with the first processing capability; or
in response to the obtained physical layer indication signaling not having the preset attribute information, determine that the target data scheduled by the physical layer indication information applies with a second processing capability different from the first processing capability.

* * * * *